INVENTORS.
DANIEL C. DURAND
PATRICK R. NUGENT
BY
ATTORNEY

June 29, 1965 D. C. DURAND ETAL 3,192,509

ZONE INDICATING AND IDENTIFICATION STORING APPARATUS FOR RECORDING TAPE

Filed May 16, 1961 2 Sheets-Sheet 2

INVENTORS.
DANIEL C. DURAND
PATRICK R. NUGENT

BY Henry L. Hanson

ATTORNEY 3,192,509

ZONE INDICATING AND IDENTIFICATION STORING APPARATUS FOR RECORDING TAPE

Daniel C. Durand, Sudbury, and Patrick R. Nugent, Wellesley, Mass., assignors to Honeywell Inc., a corporation of Delaware Filed May 16, 1961, Ser. No. 110,498
9 Claims. (Cl. 340—172.5)

A general object of the present inventon is to provide a new and improved apparatus useful in the operation and control of a data storage apparatus. More specifically, the invention is concerned with a new and improved apparatus for use with a tape transport mechanism wherein the tape associated with the mechanism is divided into a plurality of zones and wherein means are provided for continuously providing an indication of the zone of the tape being used at any particular instant.

In electronic data processing systems, it is frequently desirable to utilize some type of bulk storage device in conjunction with the data processing system in order to facilitate the storing of large amounts of data which can be called in for use in the system or read from the system into the storage device. A typical form of data processing bulk storage device is a magnetic tape which is moved past a suitable data transfer head which has signals coupled therethrough for purposes of recording and/or reading information relative to the tape. The tape transport used is generally operated at a relatively high rate of speed in order that large amounts of data can be transferred in a relatively short period of time. As these devices are generally operated without an attendant standing immediately adjacent thereto, it is necessary that provision be made for automatically indicating and determining the relationship between the tape and the data transfer head at all times. This problem becomes especially critical in the vicinity of the beginning area of the tape as well as at the end of the tape. Thus, when a magnetic tape is loaded into a tape transport and the mechanism is put into operation, it is necessary that provision be made to ensure that certain operations do not take place until such time as the tape has moved well away from the very beginning portion of the tape. Further, after the tape has been utilized for data transfer purposes along its length, it is necessary to ensure that means will indicate that the end of the tape has been reached.

Inasmuch as the data processing system with which the tape transport is adapted to be used will not know when the tape is going to be reached, it is necessary to anticipate when this will occur so that after it does occur, appropriate signals will be available for preventing a data transfer in an area where information may subsequently be lost. In order to provide for protection required relative to transferring data in the vicinity of the beginning of the tape and the end of the tape, it has been found desirable to effectively divide the tape into a plurality of zones. This may be accomplished by placing suitable markings on the tape along the length thereof and providing means for sensing the occurrence of a particular marking. The sensing of this marking, along with appropriate other signals which indicate the direction in which the tape is moving may be utilized for purposes of defining what section or zone of the tape is being used at any particular instant.

It is therefore a further more specific object of the invention to provide a new and improved apparatus useful in conjunction with a tape transport which utilizes a tape having zone indicating markings spaced along the length thereof and wherein means are provided for continuously indicating the effective zone of the tape at any particular instant.

More specifically, the present invention is concerned with a new and improved apparatus for keeping track of the zones of a data transfer tape wherein such apparatus includes means for sensing the presence of zone markings along the length of the tape as well as means for indicating the direction that the tape may be moving at any particular instant.

Inasmuch as the tape associated with the transport may be divided into a pluarilty of zones, it is desirable that the exact digital representation of each particular zone be indicated and available for reference at substantially any instant. For this purpose, a zone counter has been provided in the present invention which will be appropriately stepped as the apparatus moves the tape from one zone to next and may be interrogated on high-speed cyclic basis.

A further object of the invention is then to provide a new and improved aparatus useful with the tape transport driving a tape having a plurality of zones defined thereon wherein a digital counter is connected thereto and is stepped as the apparatus moves the tape from one zone to the next and the counter may be interrogated to determine the digital representation of the zone.

As most data processing systems have more than a single tape transport associated therewith, provisions have been made, in accordance with the principles of the present invention, to use a single counter which may be shared by a plurality of tape transports such that the counter will at any selected instant provide a digital indication of the zone status of the tape in any of the plurality of transports associated therewith.

A still further object of the invention is then to provide a new and improved digital apparatus for indicating the zone status of a plurality of tapes in a plurality of tape transports wherein the apparatus is adapted to keep track of the zone status of the tapes in all of the transports associated therewith.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
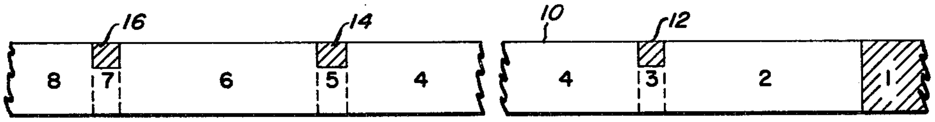
FIGURE 1 illustrates a data tape which may be associated with the prinicples of the present invention.

Referring first to FIGURE 1, the numeral 10 identifies a data transfer tape of a type which may be coated with a magnetic material useful for the storage of digital signals which are to be recorded on the surface thereof by a suitable magnetic recording head. As illustrated in FIGURE 1, the tape 10 is divided into a total of eight different zones. The first zone may be considered as the zone immediately adjacent the starting end of the tape. In the preferred embodiment of the invention this zone took the form of a clear or translucent leader. The second zone of the tape 10 as indicated by the numeral 2 is the area between the clear leader end indicated at 1 and the leading edge of a marking 12 which is positioned along the length of the tape. The marking 12, as well as the other markings utilized herein in the preferred embodiment, took the form of a clear window in the tape capable of transmitting light therethrough. Inasmuch as the marking 12 is of a finite length along the edge of the tape, the zone immediately adjacent this marking is indicated as zone 3.

The fourth zone of the tape is defined as that area of the tape extending from the marking 12 to a further marking 14 which is also positioned along the edge of the tape. This fourth zone is the zone which is normally associated with the useful data storage area of the tape. The fifth zone of the tape is defined as that area immediately adjacent the marking 14. A further marking 16, is positioned further along the length of the tape and the zone between the markings 14 and 16 is defined as zone 6. The seventh zone is the zone immediately under the marking 16, while zone 8 is that portion of the tape which is beyond the marking 16. In terms of actual locations on the tape, the marking 12, in one embodiment of the invention, was placed 32 inches down the tape from the edge of zone 1. The marking 12 was ⅛ inch in length, as were each of the markings 14 and 16. The distance between the markings 12 and 14, and consequently the length of zone 4, will, of course, be dependent upon the total length of the tape. Inasmuch as a typical reel of tape might contain as many as 2,500 feet of tape, it may be assumed that about 99% of the tape will lie in zone 4. The markings 14 and 16, in the preferred embodiment, were placed 32 inches apart, while the marking 16 was placed approximately 25 feet from the physical end of the tape.

Before considering the details of the associated apparatus, a consideration of the desired tape operations relative to the different tape zones is in order. In the apparatus with which the preferred embodiment was utilized, the orders used in directing the operation of the tape transport included a write order W, a read forward order RF, a read reverse order RR and a rewind order REW. The write order is normally associated with an instruction from the associated equipment that incoming data to the tape transport is to be written on the associated storage tape. The writing as effected in the preferred embodiment was always effected in a forward direction, that is, in the direction of ascending zone number. The read orders in the preferred embodiment could be processed both in the forward and in the reverse direction. That is, the read forward order will cause data to be read from the tape in the direction of ascending zone number, while the read reverse order will cause data to be read from the tape in the direction of descending zone number. The rewind order is normally associated with moving the tape in the direction of descending zone number.

When the data transfer head is located in zone 1, it is desired that certain control actions will take place. Thus, when a write order is received from the associated data processing system, the tape should be moved forward by the associated transport until the end of the clear leader is detected, at which time the record will be written at the beginning of zone 2. When a read forward order is received, the read process will not begin until zone 2 as there is normally no data stored in zone 1. When a read reverse order is received, special circuitry may be provided for indicating that no operation can take place since the tape is already in zone 1 and the reverse operation will produce no useful function. A similar result will obtain in the event that a rewind order is received.

If the data transfer head is located in zone 2 when a write order is received, the recording is inhibited until zone 3 is reached. This means that only one record can exist in zone 2 and the recording of this record must be initiated when the transfer head is in zone 1 as set forth in the above remarks relative to zone 1. When a read forward order is received in this zone 2, the first word of the record will be picked up in the beginning of zone 3. When a read reverse order is received in this zone, the read process of the first record on tape will be carried out, but control signals may be generated by way of the counter mechanism of the present invention to inform the user that he is reading the first record.

Should a rewind order occur within zone 2, the order will be carried out.

Inasmuch as the length of tape constituting zone 3 is only ⅛ inch, the active portion of tape will never be stopped in zone 3. If a write order is given in zone 2, the writing will not start until the leading edge of zone 3 is reached. While the record may be short enough to be entirely written in zone 3, the tape mechanism will not come to a stop until zone 4. The foregoing will also prevail with respect to a read forward order in zone 2 since the data to be read will have been written starting from the leading edge of the zone 3. A read reverse order given in zone 4 adjacent zone 3 will be carried out and the tape will be moved through zone 3 into zone 2. A further read reverse order given in zone 2 will cause an unprogrammed transfer signal to be given.

In zone 4 all of the orders discussed above will be performed in the normal manner.

Writing in zone 4 will continue normally until the leading edge of zone 5 where the zone count will be changed. If the writing continues past zone 5, zone 6 will be entered and this will be indicated by the counter. A subsequent write order may now be carried out but it will not be started until the leading edge of zone 7 has been reached. After writing this record, and upon the occurence of another write order, an unprogrammed transfer signal will be issued since the active portion of tape will now be in zone 8, or the end-of-tape region.

A read forward order given in the far end of zone 4 will be carried out into zone 6, as the record may have been written. A further read forward order which carries the tape through to zone 7 into zone 8 will also be carried out. A subsequent read forward order given in zone 8 will cause an unprogrammed transfer signal to appear.

A read reverse or rewind order will be carried out in the normal manner in zones 5, 6, 7 and 8.

From the foregoing discussion relative to the various zones on the tape, it will be readily apparent that it is extremely important that apparatus be provided for actively and continuously indicating the status of the tape zones at any particular instant.

Figure 2:
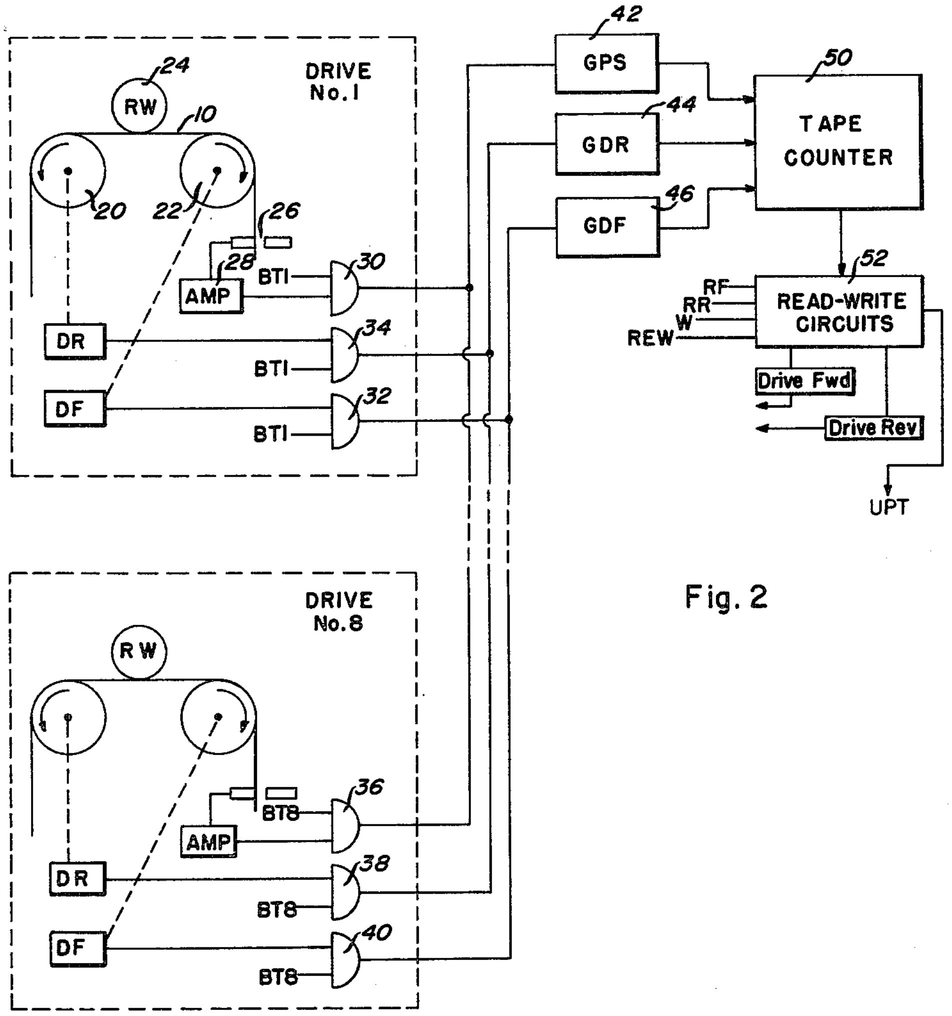
FIGURE 2 is a digrammatic illustration of the arrangement of the invention relative to a pair of tape transports.

The general organization of the apparatus used in this combination is shown in greater detail in FIGURE 2. In this figure there are two tape transports indicated generally as Drive No. 1 and Drive No. 8. Each drive may well take the form of the drive illustrated and described in the copending application of Robert A. Pendleton bearing Serial Number 15,861, filed March 18, 1960, now Patent No. 3,097,778. The heart of the tape moving portion of the drive takes the form of a pair of drive capstans 20 and 22 which are contra-rotating and are arranged to drive the tape 10 either in a forward or a reverse direction past the data transfer head 24. The coupling of the tape to the capstans 20 or 22 may be effected by pneumatic means, not shown, but described in the aforementioned Pendleton application. For purposes of the present invention, it is essential to know three basic things about each drive in order to determine the status of the zone relative to the transfer head 24 at any particular instant. For purposes of sensing the presence or absence of a clear window on the tape 10 at a particular location on the apparatus, a photosensing apparatus 26 is provided and may comprise a conventional light source and photocell combination working into an amplifier 28 to produce a step output signal whenever the light source shines through a clear window portion of the tape onto the photocell on the input of the amplifier. The output of the amplifier is arranged to be gated through a suitable gating circuit 30 upon the occurrence of a timing signal BT1.

Two additional signals are required from the tape transport relative to the direction that the tape is being moved. These signals may be provided by suitable motion-indicating circuits which may be under the control of the mechanism switching the vacuum to the capstan 20 or the capstan 22. Thus, a drive forward circuit DF and a drive reverse circuit DR are suitably arranged to provide a step signal on the output thereof in accordance with whether or not a drive forward or drive reverse signal is being utilized in the associated transport. Gating circuits 32 and 34 respectively are used for gating the signals out of the transport into an associated control unit for use in activating the zone indicating counter. Timing signals BT1 are used on each of the gates 30, 32 and 34 to provide the necessary timing of the sensing operation as required by the zone counter of the invention.

Similar sensing functions are provided with respect to the drive indicated at Drive No. 8. The output gating sections in this instance correspond to those in Drive No. 1. Thus, the gating section 36 is associated with the photo-sense function, the gate 38 is associated with the drive reverse function, while the gate 40 is associated with the drive forward function.

The outputs on the respective gating functions in each of the drives are coupled to a general function indicating circuitry which includes three separate function storage circuits indicated at 42, 44 and 46. Each of these circuits may well take the form of a bistable flip-flop which is adapted to be set by an incoming signal from any of the associated input gating circuits from the associated tape transports. Thus, if a signal from the gate 30 is applied to the circuit 42, the general photosense function GPS will become active and the output thereof will be coupled to the input of the tape zone counter indicated at 50. Similarly, a signal from the gate 34 will act upon the circuit 44 to indicate that the drive reverse function GDR is present, and this will likewise be applied to the input of the counter 50. A signal from the gate 32 will act on the circuit 46 to create the output function GDF indicating that a drive forward condition exists in Drive No. 1. This likewise is coupled to the input of the tape counter 50.

The tape counter 50 may have its output utilized in any desired manner to effect the desired operations discussed above with respect to the individual tape transports in relation to the orders being supplied thereto by external means, not shown. Thus, the tape counter 50 may be coupled to an appropriate control unit 52 which has coupled on the input thereof signals representing a read forward order RF, a read reverse order RR, a write order W and a rewind order REW. The control unit 52 may be arranged in any desired manner to perform the logic dictated by the zone use rules discussed above. The outputs will provide the desired drive forward or drive reverse signals to the tape drives or an unprogrammed transfer signal UPT when operating in the end-of-tape regions.

In the normal operation of the apparatus illustrated in FIGURE 2, there is a continuous cycling of the sensing of the zone status of the tape transports. Thus, at the time of the first timing pulse in each cycle, namely the timing pulse BT1, the pertinent zone-indicating functions from the Drive No. 1 will be fed into the circuits 42, 44 and 46. The setting of these circuits, along with the previous history of the tape zone in Drive No. 1 stored in the counter, is used to reset the counter to the new zone state, if the zone has changed. If it has not changed, the digital representation of the zone within the counter will remain unchanged and this digital indication may be used in any desired manner in the circuits 52 in response to the external control orders.

Each drive, in sequence, will have the appropriate control functions sampled by the associated timing pulse BT so that an appropriate digital indication will be provided within the counter circuitry to specifically identify the zone condition in each of the drives connected thereto. In one embodiment of the invention, eight drives were adapted to be attached to a single counter and the scanning of the zone condition with respect to all of the drives was effected in a single memory cycle of the data processor associated therewith. This memory cycle was of six microseconds duration and, consequently, the time allotted for providing an indication of each zone of each of the associated drives is slightly less than one microsecond. The need for this high rate of response to the zone conditions of the drives will be apparent when it is recognized that the orders directing a peripheral operation at the drives will be processed by the associated data processor at the high speeds directed by the fast memory cycle time referred to above.

Figure 3:
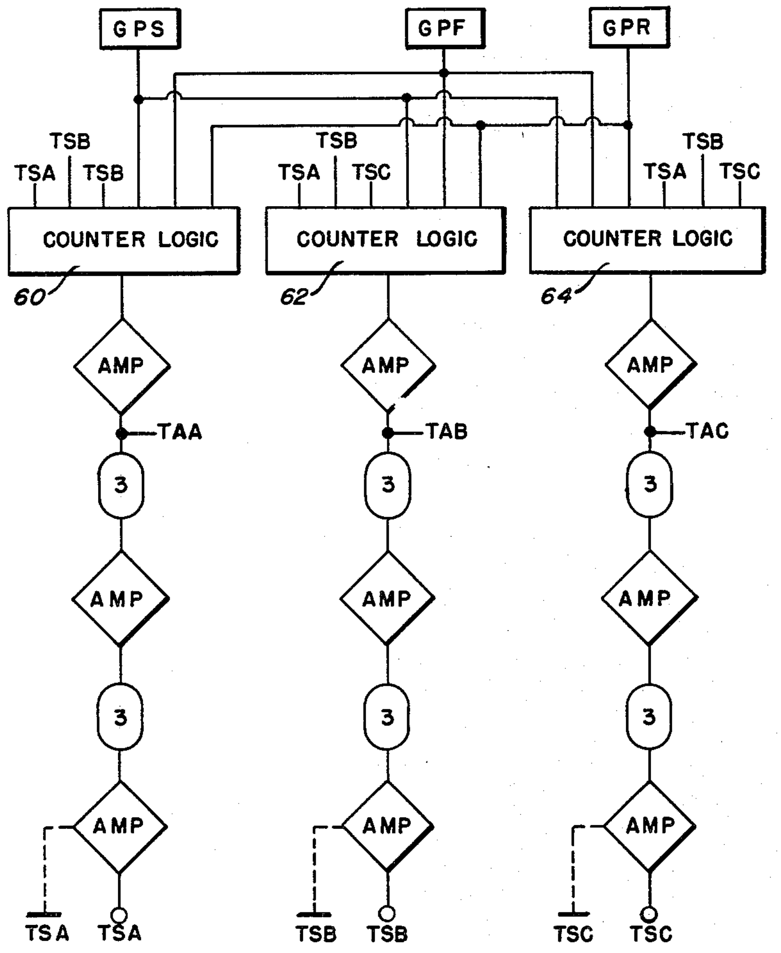
FIGURE 3 is a diagrammatic arrangement of the principal elements of the counter used in identifying the zones in the tape associated with respective input tape transports.

The detailed manner in which the counter of the present invention operates may be understood by specific reference to FIGURE 3 and the description which follows. Inasmuch as the counter associated with one preferred embodiment of the invention was for use with an eight zone tape it was necessary to provide a three-stage counter which would be able to, by way of the digital setting of the counter stages, indicate the eight zones defined in the associated tape. Inasmuch as it is necessary that the previous history of the tape zone with respect to a particular drive be known the next time an analysis is made to determine the present zone, the counter must include an appropriate storage means.

The counter, shown in FIGURE 3, will be seen to comprise three counter logic circuits 60, 62 and 64. The logic will actually take the form of gate-buffer logic, well known in the art, wherein the appropriate and/or circuitry is provided to implement the particular logical statements required to effect a counting operation. The output of the counter logic 60 is arranged to be fed through an amplifier which will have an output at terminal TAA and may be considered as a current indication of the particular drive having its input signals coupled to the counter logic one pulse period prior to the instant that the output is desired. The output of the signal from the first amplifier is arranged to be fed through an appropriate three-pulse period delay line to a further amplifier and then to a further delay line to an output amplifier. The output amplifier will have an output in two forms, the first in the assertive form TSA and the second in the negative form as $\overline{TSA}$. These signals are adapted for connection back to the input counter logic so as to provide the desired stepping in the counters in the event that there is need for a change in the digital indication of any particular drive.

In a similar manner, each of the counter logic circuits 62 and 64 are coupled through appropriate amplifiers and delay lines to provide on the output thereof the signals TSB, $\overline{TSB}$, TSC and $\overline{TSC}$.

The preferred embodiment of the invention used counter stages arranged so that a change of zone would effect a change in the status of only one of the digital circuits for each zone change. In Table 1 on the following page, there is a representative digital output for defining eight zones of the tape. It will be apparent that as the apparatus is stepped from zone 1 through zone 8, only one of the associated stages TAA, TAB and TAC will have its output stages switched in passing from one zone to the next.

*Table 1*

| Zone | TAA | TAB | TAC |
|---|---|---|---|
| 1 | 0 | 0 | 0 |
| 2 | 1 | 0 | 0 |
| 3 | 1 | 0 | 1 |
| 4 | 0 | 0 | 1 |
| 5 | 0 | 1 | 1 |
| 6 | 1 | 1 | 1 |
| 7 | 1 | 1 | 0 |
| 8 | 0 | 1 | 0 |

The manner in which the logic of the circuits 60, 62 and 64 is implemented may be illustrated by way of the logical statements set forth in Table 2. In analyzing Table 2, it should be noted that the particular logic selected has been that which is necessary to implement the counting required to produce a count comparable to that of Table 1. It will be further noted in Table 2 that the general photosense signal GPS is required to be available in both the assertive and negative forms. As will be understood by those skilled in the art, the input function GPS may take the form of a bistable flip-flop which is either in the set state or reset state in accordance with the photocell sense function derived from the particular tape transport which is being examined in any particular instant.

*Table 2*

$$TAA=\overline{TSB}\cdot\overline{TSC}\cdot GDF\cdot\overline{GPS}$$
$$+TSB\cdot TSC\cdot GDF\cdot\overline{GPS}$$
$$+TSA\cdot\overline{TSC}\cdot GDR\cdot GPS$$
$$+\overline{TSA}\cdot TSC\cdot GDR\cdot GPS$$

$$\overline{TAA}=\overline{TSB}\cdot TSC\cdot GDF\cdot\overline{GPS}$$
$$+TSB\cdot\overline{TSC}\cdot GDF\cdot\overline{GPS}$$
$$+\overline{TSA}\cdot\overline{TSC}\cdot GDR\cdot GPS$$
$$+TSB\cdot TSC\cdot GDR\cdot GPS$$

$$TAB=\overline{TSA}\cdot TSC\cdot GPS\cdot GDF$$

$$\overline{TAB}=\overline{TSA}\cdot TSC\cdot\overline{GPS}\cdot GDR$$

$$TAC=TSA\cdot\overline{TSB}\cdot GDF\cdot GPS$$
$$+TSA\cdot TSB\cdot GDR\cdot\overline{GPS}$$

$$\overline{TAC}=TSA\cdot TSB\cdot GDF\cdot GPS$$
$$+TSA\cdot\overline{TSB}\cdot GDR\cdot\overline{GPS}$$

Inasmuch as the counter of FIGURE 3 is adapted to be operated with a total of eight tape transports, it will be readily apparent that the output signals TSA, TSB and TSC, as well as the negations thereof, will be available after eight pulse periods and will be applied back to the input at a time which will correspond to the time of the next timing pulse at the tape transport used in generating the output signals at the terminals TS. Further, with eight-pulse storage provided in the counter, it is possible to store the digital zone indication of up to eight tape drives.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In combination, a tape transport, a data tape adapted to be driven in a forward or reverse direction past a data transfer means by said transport, said data tape having characteristic markings preformed thereon to divide the tape into a plurality of predetermined zones, motion indicating means connected to said transport to indicate the direction the tape is being driven, tape marking sensing means, and a zone identification counter having said motion indicating means and said tape marking sensing means connected thereto, said counter having an output indicative of the tape zone relative to said data transfer means.

2. Control apparatus for a tape transport apparatus which is adapted to drive past a data transfer head a tape having preformed markings positioned at preselected points along the length thereof to define predetermined zones relative to said transfer head, comprising a tape marking sensing means, a tape direction of motion sensing means, a digital counter adapted to be switched to a different count to identify each zone on the tape, and means connecting said marking sensing means and said motion sensing means to said counter to step said counter in accordance with zone changes on said tape.

3. In combination, a tape transport, a data tape adapted to be driven in a forward or reverse direction past a data transfer means by said transport, said data tape having characteristic markings preformed thereon to divide the tape into a plurality of predetermined zones, motion indicating means connected to said transport to indicate the direction the tape is being driven, tape marking sensing means, and a zone identification counter having said motion indicating means and said tape marking sensing means connected thereto, said counter having an output indicative of the tape zone relative to said data transfer means and comprising a multi-stage recirculating counter with the feedback from the output of the counter being indicative of a previous zone history to be compared with the present state of said motion indicating means and said marking sensing means.

4. Control apparatus for a tape transport apparatus which is adapted to drive past a data transfer head a tape having preformed markings positioned at selected points along the length thereof to define predetermined zones relative to said transfer head, comprising a tape marking sensing means, a tape direction of motion sensing means, a digital counter adapted to be switched to a different count to identify each zone on the tape, means connecting said marking sensing means and said motion sensing means to the input of said counter, means storing the previous zone identifying count, and means connecting said storing means to the input of said counter with the input from said marking sensing means and said motion sensing means to step said counter to give the present zone status of said tape relative to said data transfer head.

5. In combination, a plurality of tape transports each adapted to reversibly drive a tape past a data transfer head, each tape having markings selectively positioned along the length thereof to define predetermined zones, marking sensing means positioned adjacent the tape in each transport, tape direction of motion sensing means connected to each transport, a single zone identification counter connected to all of said tape transports, and means selectively gating the marking sensing means and the motion sensing means of each tape transport into the input of said counter in a predetermined sequence, said counter being stepped to indicate the zone of each tape relative to its data transfer head in said predetermined sequence.

6. In combination, $n$ tape transports each adapted to reversibly drive a tape past a data transfer head, each tape having markings selectively positioned along the length thereof to define $m$ predetermined zones, a marking sensing means positioned adjacent the tape in each transport, a tape direction of motion sensing means connected to each transport, a single zone identification digital counter connected to all of said tape transports, and adapted to have digital storage for identifying $m$ times $n$ zones and means selectively gating the marking sensing means and the motion sensing means of each tape transport into the input of said counter in a predetermined sequence, said counter being stepped to indicate the zone of each tape relative to its data transfer head in said predetermined sequence.

7. In combination, a plurality of tape transports each adapted to reversibly drive a tape past a data transfer head, each tape having markings selectively positioned along the length thereof to define predetermined zones, marking sensing means positioned adjacent the tape in each transport, tape direction of motion sensing means connected to each transport, a single multi-digit zone identification counter connected to all of said tape transports, said counter being adapted to store a previously indicated zone condition and means selectively gating the marking sensing means, and the motion sensing means of each tape transport into the input of said counter in a predetermined sequence with the stored previously indicated zone condition, said counter being stepped to indicate the zone of each tape relative to its data transfer head in said predetermined sequence.

8. Control apparatus for a tape transport apparatus which is adapted to drive past a data transfer head a tape having markings positioned at preselected points along the length thereof to define predetermined zones relative to said transfer head, comprising a tape marking sensing means, a tape direction of motion sensing means, a digital counter, said digital counter having a plurality of bistable stages whose digital state at any one instant is indicative of the zone of the associated tape relative to said transfer head, said stages being adapted to be switched to a different bistable state to identify each zone on the tape, and means connecting said marking sensing means and said motion sensing means to said counter to step said counter in accordance with zone changes on said tape.

9. In combination, a tape transport, a data tape adapted to be driven in a forward or reverse direction past a data transfer means by said transport, said data tape having characteristic markings pre-established thereon to divide the tape into a plurality of predetermined zones, motion indicating means connected to said transport to indicate the direction the tape is being driven, tape marking sensing means, and a zone identification counter having said motion indicating means and said tape marking sensing means connected thereto, said counter having an output indicative of the tape zone relative to said data transfer means, and means continuously recirculating the output of said counter to the input thereof.

References Cited by the Examiner

UNITED STATES PATENTS

| | | | |
|---|---|---|---|
| 2,479,681 | 8/49 | Handley | 235—92 |
| 2,605,967 | 8/52 | Stone | 235—92 |
| 2,656,106 | 10/53 | Stabler | 235—92 |
| 2,904,776 | 9/59 | Neff | 340—174.1 |
| 2,937,368 | 5/61 | Newby | 340—174.1 |

OTHER REFERENCES

Richards: Arithmetic Operations in Digital Computers, Nostrand, 1955 (FIGS. 7–4 to 7–7).

MALCOLM A. MORRISON, *Primary Examiner.*

CORNELIUS D. ANGEL, *Examiner.*